United States Patent
Stiles, Jr.

(10) Patent No.: US 12,451,693 B2
(45) Date of Patent: Oct. 21, 2025

(54) POOL AND SPA ENERGY DEMAND RESPONSE SYSTEMS AND METHODS

(71) Applicant: ZODIAC POOL SYSTEMS LLC, Carlsbad, CA (US)

(72) Inventor: Robert Warren Stiles, Jr., San Marcos, CA (US)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 503 days.

(21) Appl. No.: 17/885,985

(22) Filed: Aug. 11, 2022

(65) Prior Publication Data
US 2023/0046254 A1   Feb. 16, 2023

Related U.S. Application Data

(60) Provisional application No. 63/233,597, filed on Aug. 16, 2021.

(51) Int. Cl.
*H02J 3/14*   (2006.01)
*G05B 19/416*   (2006.01)

(52) U.S. Cl.
CPC .......... *H02J 3/144* (2020.01); *G05B 19/416* (2013.01); *G05B 2219/37371* (2013.01)

(58) Field of Classification Search
CPC .......... H02J 2310/60; H02J 3/14; H02J 3/144; Y04S 20/222; Y02B 70/3225; G05F 1/66; G05B 15/02; G05B 19/048
See application file for complete search history.

(56) References Cited

U.S. PATENT DOCUMENTS

| | | | | |
|---|---|---|---|---|
| 8,332,666 | B2 * | 12/2012 | Boss .................. | H02J 3/14 713/320 |
| 2009/0018706 | A1 * | 1/2009 | Wittner ................ | H02J 3/14 706/47 |
| 2010/0185338 | A1 * | 7/2010 | Montgomery ......... | H02J 3/14 700/292 |

(Continued)

FOREIGN PATENT DOCUMENTS

EP   2487768 A1   8/2012

OTHER PUBLICATIONS

Pool Supply Unlimited, "Pool Supplies", (Jan. 24, 2021), <URL: https://www.poolsupplyunlimited.com/pool/>, p. 1-2 (Year: 2021).*

(Continued)

*Primary Examiner* — Mong-Shune Chung
(74) *Attorney, Agent, or Firm* — Kilpatrick Townsend & Stockton LLP (57) ABSTRACT

A pool automation system is connectable with one or more pieces of equipment associated with a swimming pool or spa. The pool automation system may receive a demand event with a requested load reduction, and the pool automation system may determine a demand response for the one or more pieces of equipment associated with the swimming pool or spa based on the demand event and based on information gathered by the pool automation system about the at least one piece of equipment. The demand response may be based on a prioritization of the one or more pieces of equipment associated with the swimming pool or spa. The pool automation system may implement control of the one or more pieces of equipment associated with the swimming pool or spa responsive to the demand event.

20 Claims, 7 Drawing Sheets

(56) References Cited

U.S. PATENT DOCUMENTS

| | | | |
|---|---|---|---|
| 2012/0245753 A1 | 9/2012 | Forbes, Jr. | |
| 2015/0276253 A1* | 10/2015 | Montalvo | H04L 12/2827 |
| | | | 700/276 |
| 2017/0134182 A1* | 5/2017 | Davis | H04Q 9/00 |
| 2019/0361511 A1* | 11/2019 | Gelonese | G06Q 30/0207 |
| 2023/0231381 A1* | 7/2023 | Tsuda | H02J 3/14 |
| | | | 700/295 |
| 2023/0318827 A1* | 10/2023 | Seetharamakrishnan | |
| | | | H02J 13/00001 |
| | | | 713/171 |

OTHER PUBLICATIONS

Pool Supply Unlimited, "Spa Supplies", (Jan. 16, 2021), <URL: https://www.poolsupplyunlimited.com/spa/>, p. 1 (Year: 2021).*

Mike Farley SWD ASLA, "The Top 10 Fire Features with Pools by Mike Farley", (Dec. 20, 2020), <URL: https://www.youtube.com/watch?v=yOY5cWORH68/>, p. 1-3 (Year: 2020).*

International Application No. PCT/US2022/040058, International Search Report and Written Opinion mailed on Nov. 28, 2022, 11 pages.

International Application No. PCT/US2022/040058, International Preliminary Report on Patentability mailed on Feb. 29, 2024, 8 pages.

European Application No. 22762211.5, Office Action mailed on Mar. 27, 2025, 4 pages.

\* cited by examiner

POOL AND SPA ENERGY DEMAND RESPONSE SYSTEMS AND METHODS

REFERENCE TO RELATED APPLICATION

This application claims the benefit of U.S. Provisional Patent Application No. 63/233,597, filed on Aug. 16, 2021, and entitled POOL AND SPA ENERGY DEMAND RESPONSE SYSTEMS AND METHODS, the content of which is hereby incorporated by reference in its entirety.

FIELD OF THE INVENTION

This application relates to controlling electrical loads for pools, spas, and other water containing vessels for recreation or therapy.

BACKGROUND

Utility providers, such as electricity providers or aggregators, may seek to control loads of electricity in certain times in an attempt to balance production of electricity or storage of electricity with actual demand of electricity from residential and commercial customers. Currently, customers are able to opt-in to programs for controlling electricity demand. In such instances, the electricity provider can shut off or reduce power to the customer's home when required (e.g., when demand exceeds power supply). If the power goes off at an inconvenient time, customers are inclined to dis-enroll from the program, and thus retention for these voluntary demand response programs can be low. Currently, loads to pools and spas are controlled by turning the water pump off in times of high demand.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some embodiments, a method of controlling a pool or spa includes receiving a demand event with a requested load reduction and determining a demand response for at least one piece of pool equipment or feature associated with the pool or spa. The demand response may include noncompliance, partial compliance, or full compliance with the load reduction.

According to various embodiments, a demand response system includes a controller for receiving a demand event, receiving system information from an electrical system, and determining a demand response for the electrical system based on the received demand event and based on the system information from the electrical system.

A pool automation system may include a controller connectable to at least one piece of equipment associated with a pool and configured to receive a demand event with at least one demand characteristic and a requested load reduction, determine a demand response based on the at least one demand characteristic and a characteristic of the at least one piece of equipment, and control the at least one piece of equipment pursuant to the demand response.

According to certain embodiments, a pool automation system includes a controller connectable to at least one piece of equipment associated with a pool, where the controller is configured to receive a demand event with at least one demand characteristic and determine a demand response based on the at least one demand characteristic of the demand event.

A pool automation system may include a controller connectable to at least one piece of equipment associated with a pool. The controller tray receive a demand event comprising at least one demand characteristic and determine a demand response based on a response preference and/or time of day of the demand event and such that the demand response meets the at least one demand characteristic.

According to some embodiments, a demand control system may receive a demand event with at least one demand characteristic, receive information from a plurality of pool automation systems, and determine an aggregate demand response for the plurality of pool automation systems such that the demand response meets the at least one demand characteristic.

According to various embodiments, a pool automation system includes a controller connectable to at least one piece of equipment associated with a pool. The controller may receive a demand event comprising at least one demand characteristic and determine a demand response that meets the at least one demand characteristic based on at least one of a utilization of the at least one piece of equipment, a schedule for the at least one piece of equipment, or pool industry knowledge.

A pool automation system may include a controller connectable to at least one piece of equipment associated with a pool, and the controller may receive a demand event and determine a demand response based on information gathered by the pool automation system about the at least one piece of equipment.

Various implementations described herein may include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE FIGURES

The specification makes reference to the following appended figures, in which use of like reference numerals in different figures is intended to illustrate like or analogous components.

DETAILED DESCRIPTION

Disclosed are systems and methods for controlling power loads to pools and spas when electricity demand exceeds supply (e.g., a "demand event"). Pools and spas demand high electrical loads, and therefore having advanced systems and methods for controlling or limiting these loads when demand exceeds power capacity (e.g., "demand response") in a holistic way that is as unobtrusive as possible to the pool or spa owner is desired. In some embodiments, the demand response is controlled using information gathered from pool and spa automatic systems. References to "pools" and "swimming pools" herein may also refer to spas or other water containing vessels or structures used for recreation or therapy. Although this description is directed to pools and spas, the disclosed systems and methods could be applied to any suitable application, including home or automotive energy usage.

Currently, pool and spa loads are controlled by turning off the water pumps in times of high energy demand. Not only are there health and safety concerns if the pump is turned off at inopportune times, but such an approach misses an opportunity to reduce substantial loads driven by other aspects of the pool or spa.

Figure 1:
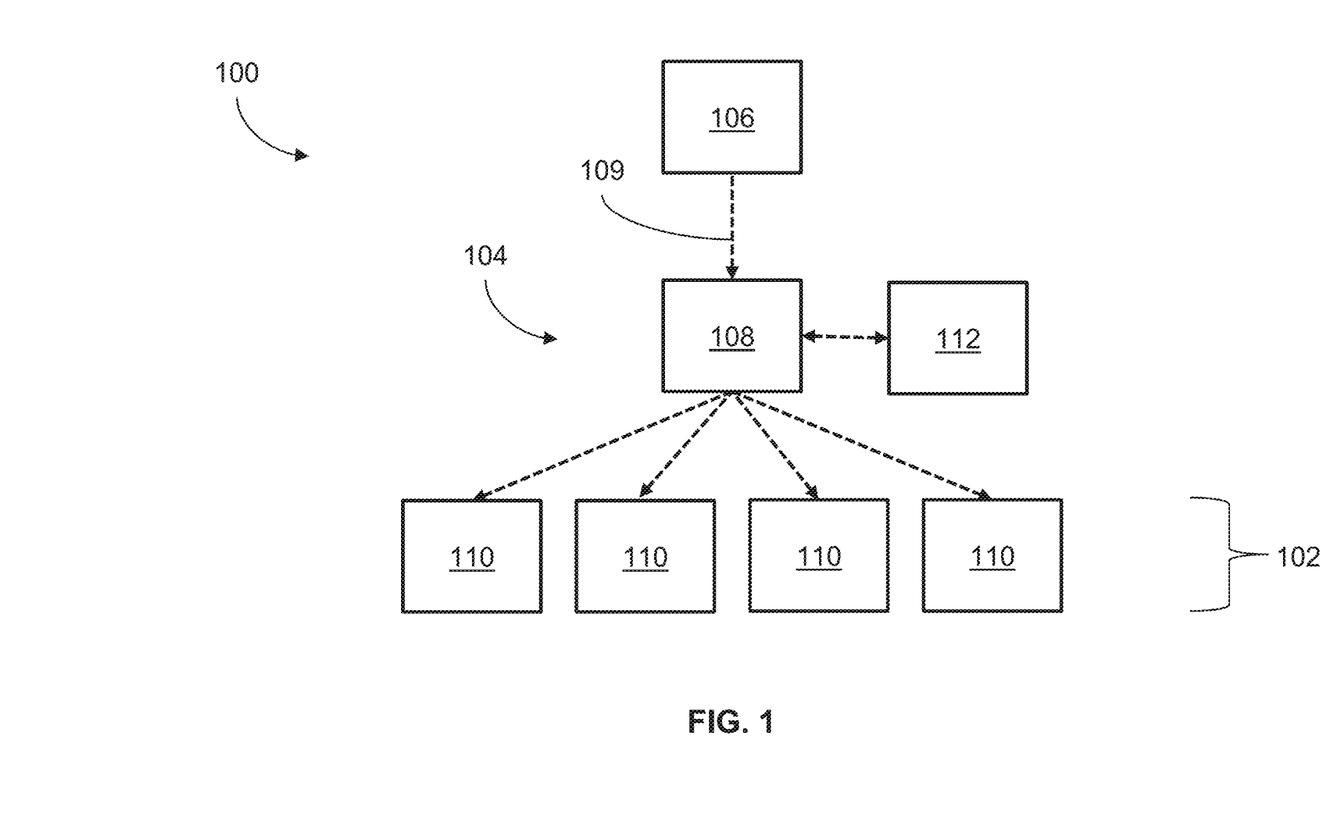
FIG. 1 illustrates an example of a demand response system according to embodiments.
Figure 2:
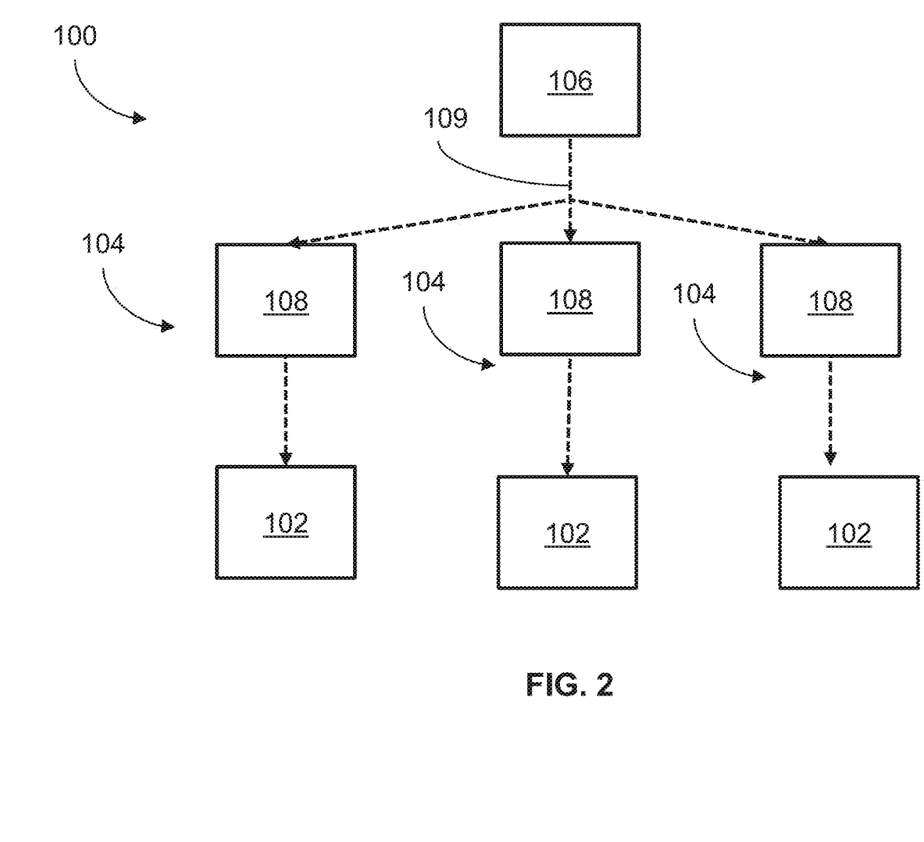
FIG. 2 illustrates another example of a demand response system according to embodiments.

FIG. 1 illustrates a demand response system 100 that includes at least one pool system 102 according to embodiments, and FIG. 2 illustrates the demand response system 100 including a plurality of pool systems 102. In general, a pool automation system 104 may include one or more controllers 108 that are communicatively coupled with various pool components, equipment, systems, or features 110 (hereinafter "pool components 110") associated with a pool. The controller 108 may be various types of control devices as desired, and in one non-limiting example the controller 108 is a processing device or processing system with one or more processors and/or one or more memory devices. The pool components 110 may include, but are not limited to, pool lights, pool pumps, booster pumps, electric cleaners, heaters, water features such as fountains or waterfalls, other entertainment features, fire features, heat pumps, sanitizers, filtration systems, primary sanitizers, spas, and/or other features or combinations of features as desired. The pool automation system 104 may be used to monitor and gather information about such components and/or to control such components. While four pool components 110 are illustrated in FIG. 1, the number should not be considered limiting.

In various embodiments, the pool automation system 104 may allow for prioritization and/or categorization of the various pool components 110 of the pool system 102 into various control groups for a demand response. The prioritization and/or categorization by the pool automation system 104 may be based on various operating characteristics and/or conditions. Such operating characteristics may be determined and/or provided from a user device 112 of a user or by the pool automation system as desired. As some non-limiting examples, the pool automation system 104 may determine the various control groups of pool components 110 based on one or more of power usage, rules provided by the user via the user device 112 and/or determined based on operating conditions, user selected preferences via the user device 112, criticality to user health, criticality to safe pool operation, monetary cost, sub-combinations thereof, and/or other operating characteristics or combinations of characteristics as desired.

As a non-limiting example, the pool automation system 104 may allow for categorization of the pool components 110 based on a criticality to health and safe operation of the pool system 102. As an example, a pump might be identified as "critical" and placed in a first control group, and a waterfall might be identified as "non-critical" and placed in a second control group.

As another non-limiting example, the pool automation system 104 may allow for categorization of the pool components 110 based on power usage. As an example, a first control group of pool components 110 may use 5 Megawatts while a second control group of pool components 110 uses 10 Megawatts.

As yet another non-limiting example, the pool automation system 104 may allow for categorization based on a user's preference. As an example, a user may prefer that pool lights never go off, even though they may not be a critical component to pool operation.

Various other types of groupings or categorizations of the pool components 110 may be used, and in some embodiments, multiple criteria may be used. As a non-limiting example, the pool automation system 104 may allow for a grouping based on power usage, and within each tier or grouping, the pool components 110 may be prioritized based on user preference and/or based on historical or predicated operating conditions. As an example, the pool automation system 104 may determine that water features (e.g., waterfalls), heat pumps, secondary sanitizers, filtration systems, primary sanitizers, a spa, and primary heat source all use 5 Megawatts and are thus in the same group based on power, and within this group, further identifies the filtration systems, primary sanitizers, spa, and primary heat are "critical" and thus prioritized during a demand event. Various other groupings of the pool components 110 based on multiple criteria may be used as desired.

In some embodiments, the pool automation system 104 is also configured to receive a demand event 109 from a demand source 106 including, but not limited to, an electricity (or utility) provider and/or an aggregator. In such embodiments, the pool automation system 104 may receive the demand event 109 in the form of a signal and/or other suitable type or request as desired from the demand source 106 with various information about the demand event 109. The information about the demand event 109 provided to the pool automation system 104 may include, but is not limited to, a current load level, a target load level, a requested amount of load to be shed, a demand event duration, sub-combinations thereof, and/or other demand event information as desired.

In various embodiments, responsive to the received demand event 109, the pool automation system 104 may determine a particular demand response based on various prioritizations and/or categorizations of the components. In some embodiments, responsive to the demand event 109, the pool automation system 104 may (i) determine whether to comply with or otherwise follow the received demand event 109 (e.g., comply in whole, in part, or not at all), and, if complying at least in part, (ii) determine what components of the pool system 102 to control (e.g., reduce performance, shut off, etc.) to meet the demand response need. As a non-limiting example, the pool automation system 104 may receive the demand response and determine that the pool automation system 104 will not comply with the requested demand need (e.g., due to safety, criticality, user selection, etc.). As another non-limiting example, the pool automation system 104 may determine that the pool system 102 can accommodate the demand event in part. In yet other non-limiting examples, the pool automation system 104 may determine that the pool system 102 can accommodate the demand event 109 in full.

Utilizing info nation from a pool automation system 104 allows more clarity and insight into each individual pool or spa, as the pool automation systems 104 know all components connected to the pool and spa and control and monitor operation of such components. As each pool differs in their requirements to meet health and safety needs, along with a myriad of possibilities on non-critical components (e.g., waterfalls, fire effects, lighting, and cleaning, etc.), among other possible controls, it is not only possible to increase the availability of possible loads to mitigate, but also to do this with regard to serious health and safety concerns offered by current solutions that only focus on a water pump and/or without regard to requirements for a particular pool. In certain aspects, a more holistic demand response utilizing information from pool automation systems 104 may help achieve higher mitigation of loads, high customer retention in voluntary demand response programs, and easy customer acquisition with high value proposition. Such a response also avoids the pitfalls of health and safety concerns of turning off a pool or spa pump (and/or other critical or prioritized components) at inappropriate times. Instead of powering off a device in isolation, the disclosed systems and methods take a more holistic approach to a demand response.

In some embodiments, the pool automation system 104 may customize a demand response depending on the particulars of the demand event 109. For example, the demand event 109 can be categorized into various levels depending on the amount that demand exceeds power capacity, a demand event duration, a target demand level, combinations thereof, and/or other particulars or characteristics as desired. As a non-limiting example, the demand event 109 can be characterized by various levels (e.g., a level one event that requires a small reduction in load, a level two event that requires a modest reduction in load, a level three event that requires a large reduction in load, and so forth). In this example, the pool automation system 104 may receive a demand event 109 having a level and customize a demand response to meet the required load reduction for the level of the demand event. In such examples, the pool automation system 104 may determine one or more pool components 110 to control such that the demand response meets the required load reduction. As some non-limiting examples, the demand response to a level one demand event 109 might result in the system 104 decreasing the pool pump(s) speed and/or power and/or spa pump speed/flow/pressure performance; the demand response to a level two demand event 109 might result in the system 104 decreasing the pool pump(s) speed and power coupled while also turning off other non-critical loads (e.g., waterfalls, cleaning systems, etc.), while spa operation will not be disrupted; and the demand response to a level three demand event 109 might result in the system 104 turning off all pool and spa systems.

Moreover, as shown in FIG. 2, information from a plurality of pool automation systems 104 can be aggregated and acted on accordingly. If enough pools and spa systems are part of the demand response (e.g., a plurality of pool and spa systems are aggregated), making small energy reductions to each individual pool or spa results in a large overall energy reduction. In other words, turning off the waterfalls of one or two pools or spas alone might not result in much of load decrease, but turning off the waterfalls of aggregated pools and spas could be a significant enough load reduction to address the demand event 109 without disrupting other aspects of each individual pool and spa (e.g., the pumps and lights could remain turned on, even in a level two demand event).

In some embodiments, the demand response can be customized using the pool automation system 104 based on customization inputs including but not limited to the preferences of the user and/or the time of day of the demand event 109 and/or other historical or future operating, conditions of the pool or spa. For example, the system 104 could be configured to turn off the pool lights if the demand event 109 happens in the middle of the day but turn off the waterfall and keep the pool lights turned on if the demand event 109 happens in the evening when lighting is needed for safety reasons. In another example, a user might choose to always turn off the pool or spa waterfall as a first option in response to a demand event 109. In another example, a user might choose which pool components 110 of the pool or spa may be turned off during a demand event 109 (e.g., a waterfall or a pool cleaner), and which pool components 110 may not be turned off during a demand event 109 (e.g., a pool pump).

In another example, the pool automation system 104 might provide information about the pool components 110 of the pool or spa that generally have low utilization, and the demand response might be customized to turn off such pool components 110 with low utilization as a first option in response to a demand event 109.

In yet another example, the pool automation system 104 can provide information about the programmed schedules for running particular pools and spas (and thus pool components 110) and determine when to activate the demand response (e.g., when to turn off aspects of the pool or spa in response to a demand event 109) based on the programmed schedule.

As yet another example, the system 104 can determine how much energy savings could be achieved based on the time of day and knowledge of pool schedules and/or past performance and act accordingly. As a non-limiting example, more energy savings could be achieved if pool or spa systems are turned off in times of high demand for such pool or spa systems than if the pool or spa systems are turned off when such pool or spa systems otherwise are not running. As another example, the demand response might be customized to the particular demand event 109 (e.g., based on the load reduction required) using general pool industry knowledge, such as knowledge that a chlorinator uses a relatively large amount of energy and therefore could be turned off at the appropriate time to meet the requirements of a particular demand event 109.

The algorithms/logic for determining how the pool or spa responds to a particular demand event can be preprogrammed using individual user preferences, historical or scheduled future performance of the pool or spa (gathered from a pool automation system 104, for example), and/or preprogrammed rules based on knowledge of the pool industry (e.g., if a demand event occurs when it is dark outside, the pool lights should not be turned off for safety reasons).

In certain embodiments, the systems 104 described herein may also rebuild and/or reinstitute a schedule for items that were exposed to a demand event 109 and controlled (e.g., had their function reduced, turned off, etc.), but require more time to function to meet their daily obligations to the pool system 102. As a non-limiting example, the systems 104 may rebuild and/or reinstitute a schedule for pool components 110 important for water sanitization, clarity, etc. that were controlled and/or turned off responsive to the demand event 109, but require a certain amount of time to function to provide necessary sanitization, etc. In some non-limiting examples, the system 104 may perform or do a "test" and "trend" to consider if it is needed to extend the daily schedule further to meet these obligations. Such considerations may be performed using inputs, data and/or history and may allow for the system 104 to make such decisions and extend or end the daily routines based on factors caused by the demand event. In other words, in the holistic approach, each demand event 109 could run this algorithm looking for inconsistencies caused by the time and length of the event that affects items in a non-linear way. As a non-limiting example, the system 104 may determine that the pump needs to be run an hour or two longer to keep clarity and sanitization levels within certain thresholds, and as a result, adjusts the schedule/control the pump accordingly. As another non-limiting example, the system 104 may determine that it needs to continue to run the pool system 102, including, e.g., some form of primary sanitizer, longer because oxidation-reduction potential (ORP) levels dropped further than anticipated during the demand event 109. As yet another non-limiting example, pH or chlorine (CL) levels can get out of control exponentially when affected by a linear change in pool operation, depending on time of day and/or other factors. A feedback loop may be used to recover levels back within acceptable levels such that the corrective action taken is specific to the demand event and the requirements of the particular pool system affected by the demand event. Various other rebuilding and/or reinstituting of schedules may be determined and implemented as desired.

Figure 3:
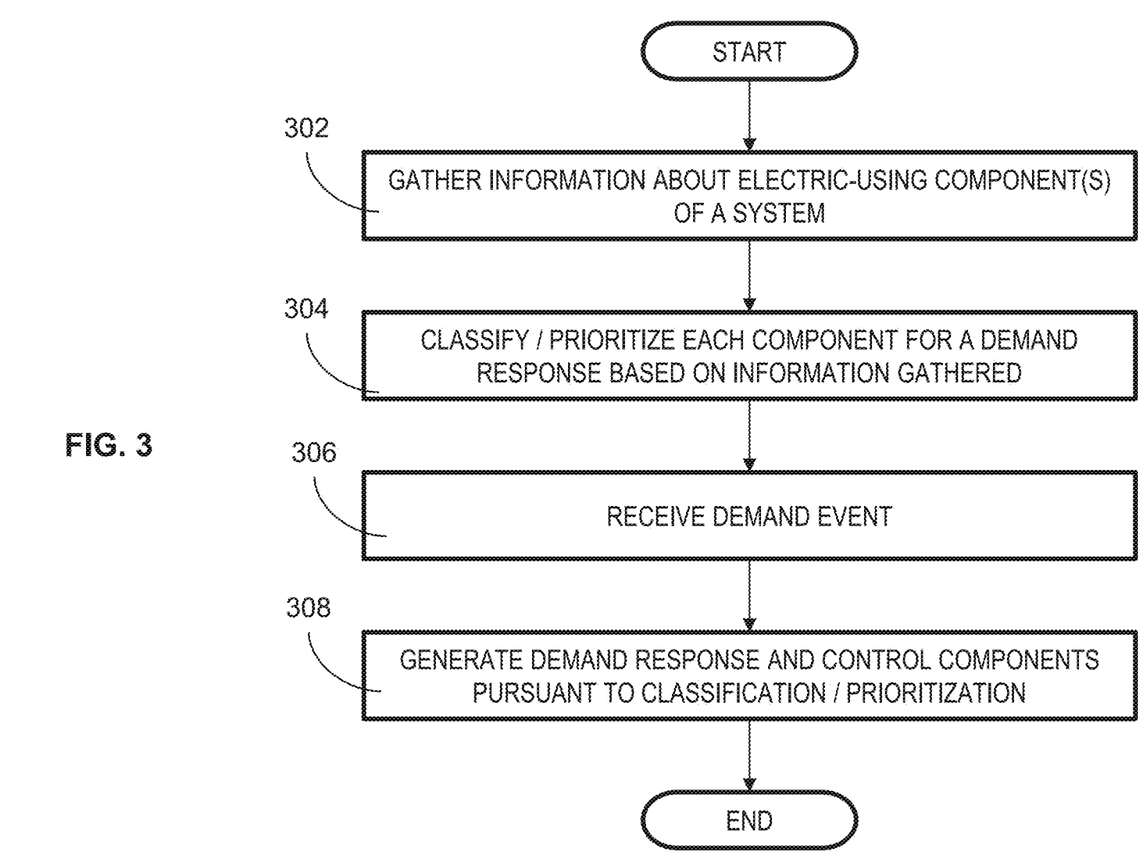
FIG. 3 illustrates a method for providing a demand response according to embodiments.

FIG. 3 illustrates a non-limiting example of a demand response method according to embodiments.

In a block 302, the method includes gathering information about electric-using components of a system. In certain embodiments, block 302 is performed by the pool automation system 104, and the information is gathered from the pool components 110 via wired communication, wireless communication, and/or as otherwise desired. Additionally, or alternatively, a user may provide information to the pool automation system 104 via the user device 112.

In a block 304, the method includes classifying and/or prioritizing each pool component 110 based on the information gathered in block 302. The pool automation system 104 may classify and/or prioritize the pool components 110 based on one or more criteria, operating characteristics, and/or conditions. Block 304 may be performed based on various operating, characteristics, conditions, and/or criteria as desired, such as but not limited to user selected preferences via the user device 112, criticality to user health, criticality to safe pool operation, monetary cost, power usage, sub-combinations thereof, and/or other operating characteristics or combinations of characteristics as desired.

In a block 306, the method includes receiving a demand event from the demand source 106 such as but not limited to, an electricity provider and/or an aggregator.

In a block 308, the method includes generating a demand response based on the demand event and controlling the pool components 110 based on the classifications and prioritizations. In some embodiments, the pool automation system 104 may decide to not comply or follow the demand event based on classifications of the pool components 110 and/or requests of the demand event (e.g., the pool automation system 308 may "ignore" the demand event, and the demand response in block 308 would be not implementing any control to comply with the demand event). As an example, the pool automation system 110 may decide that the active pool components 110 are all critical and/or the user has selected all the components 110, and thus the pool automation system 110 decides to not comply with a demand event. In other embodiments, the pool automation system 308 may at least partially comply with the demand event. As an example, the demand event may request a reduction of 10 Megawatts in load from the pool system 102, and the pool automation system 104 may determine based on classifications and prioritizations of components 110 that the pool system 102 can only shed 5 Megawatts of load. In this example, in block 308, the pool automation system 104 may control the components 110 to reduce load by 5 Megawatts, thereby partially complying with the 10 Megawatt request. As yet another example, the pool automation system 104 may fully comply with the demand event, and in such embodiments the pool automation system 308 may control the components 110 to comply based on the prioritization (e.g., deactivating and/or controlling the lowest priority components first).

Figure 4:
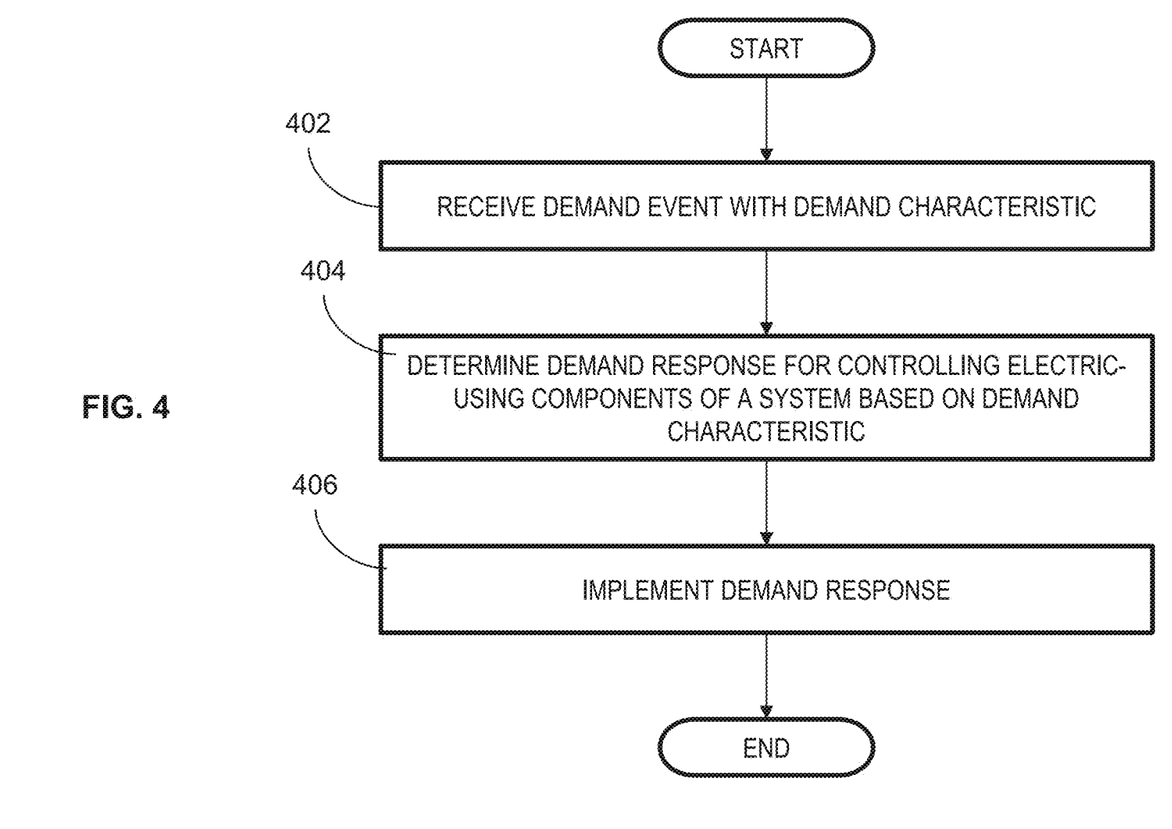
FIG. 4 illustrates a method for providing a demand response according to embodiments.

FIG. 4 illustrates a non-limiting example of a demand response method according to embodiments, and which may be implemented for a single pool or a plurality of pools.

In a block 402, the method may include the pool automation system 104 receiving the demand event from a demand source 106, and the demand event includes at least one characteristic such as but not limited to a current load level, a target load level, a requested amount of load to be shed, a demand event duration, a time of day of the demand event, a price of electricity, sub-combinations thereof, and/or other demand event information as desired.

In a block 404, the method includes determining, by the pool automation system 104, a demand response based on the demand characteristic (as well as prioritization and/or classification of the pool components 110). Block 404 may include a determination not to comply with the demand event, a determination to at least partially comply with the demand event, and/or a determination to fully comply with the demand event. As non-limiting example, based on the demand event being from 12 PM-5 PM, the pool automation system 104 may determine to not comply with the demand event because the pool automation system 104 receives input from the user that a party is planned for the same time period and/or does not want to comply within such a time period. As another non-limiting example, based on the price of electricity during the demand event, the pool automation system 104 may decide to partially comply with the demand event to provide cost savings to the user (e.g., based on a user input that the user desires to spend a certain amount on pool operations). As a further non-limiting example, the pool automation system 104 may decide to fully comply with the demand event based on a short demand event duration (e.g., 1 hour).

In block 406, the method includes implementing the demand response if the pool automation system 104 determines in block 404 that it will at least partially comply with the demand event.

Figure 5:
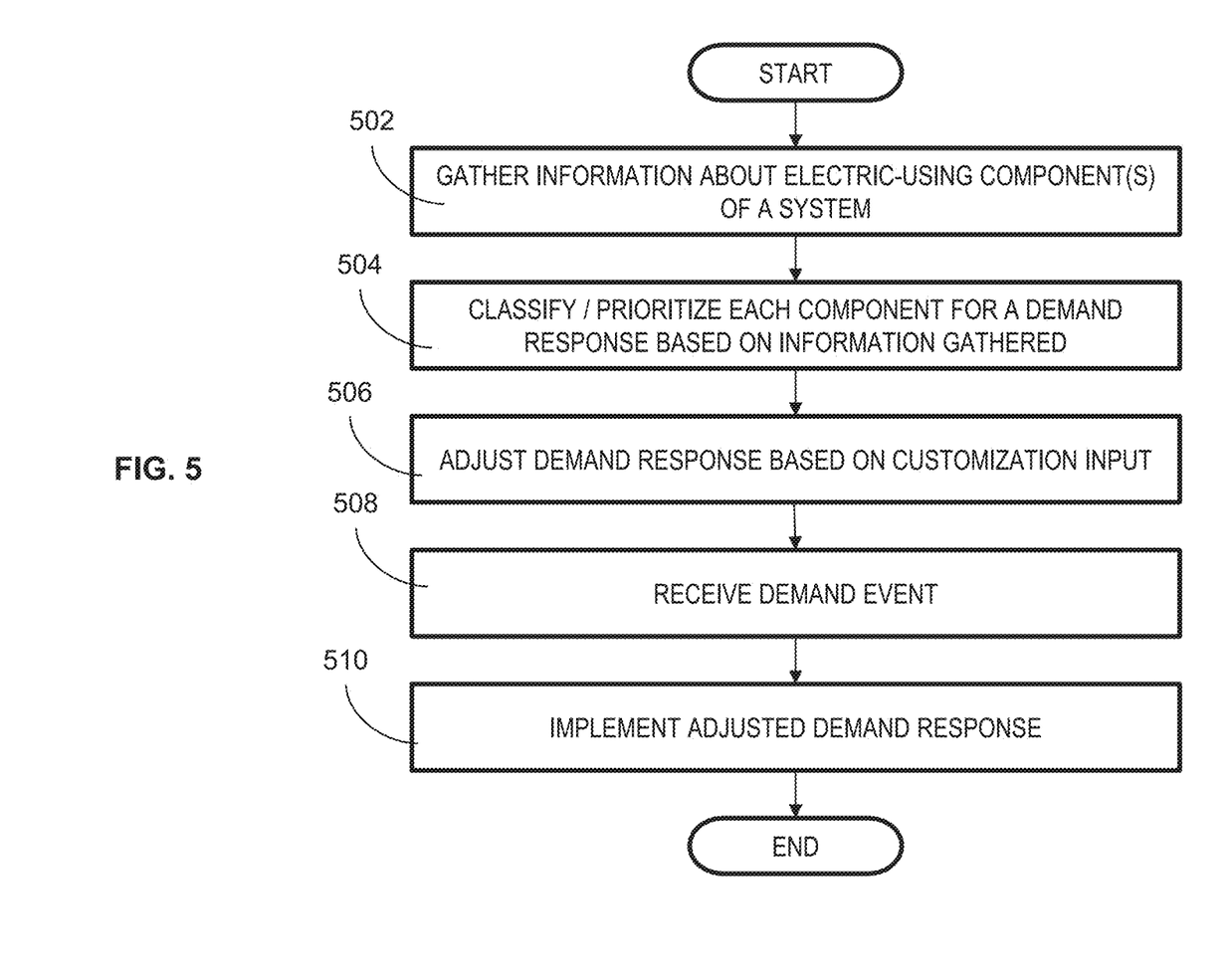
FIG. 5 illustrates a method for providing a demand response according to embodiments.

FIG. 5 illustrates a non-limiting example of a demand response method according to embodiments, and which may be implemented for a single pool or a plurality of pools.

In a block 502, the method includes gathering information about electric-using components of a system. In certain embodiments, block 302 is performed by the pool automation system 104, and the information is gathered from the pool components 110 via wired communication, wireless communication, and/or as otherwise desired.

In a block 504, the method includes classifying and/or prioritizing each pool component 110 based on the information gathered in block 502. Block 504 may be substantially similar to block 302.

In a block 506, the method includes receiving customization information from the user and adjusting the demand response prioritization and/or classification based on the customization information. As a non-limiting example, in the block 502 the pool automation system 104 may classify a waterfall feature as a non-critical and low priority component 110 during a demand event based on safety criticality and health criticality, and in block 506 the user may provide input that the waterfall feature should never turn off, thereby changing the priority of the waterfall feature (and thus the demand response). As another non-limiting example, in the block 502 pool automation system 104 may classify and prioritize the pool components 110 for the demand event, and in the block 506 the user may provide customization information that the user never wants to comply with a demand response between the hours of 9 AM 11 AM, thereby changing the potential demand response available during such hours.

In a block 508, similar to block 306, the method includes receiving the demand event. In the block 510, similar to the block 308, the pool automation system 104 determines whether to comply with the demand event, and if the pool automation system 104 decides to at least partially comply with the demand event, block 510 includes controlling the pool equipment to provide the demand response.

Figure 6:
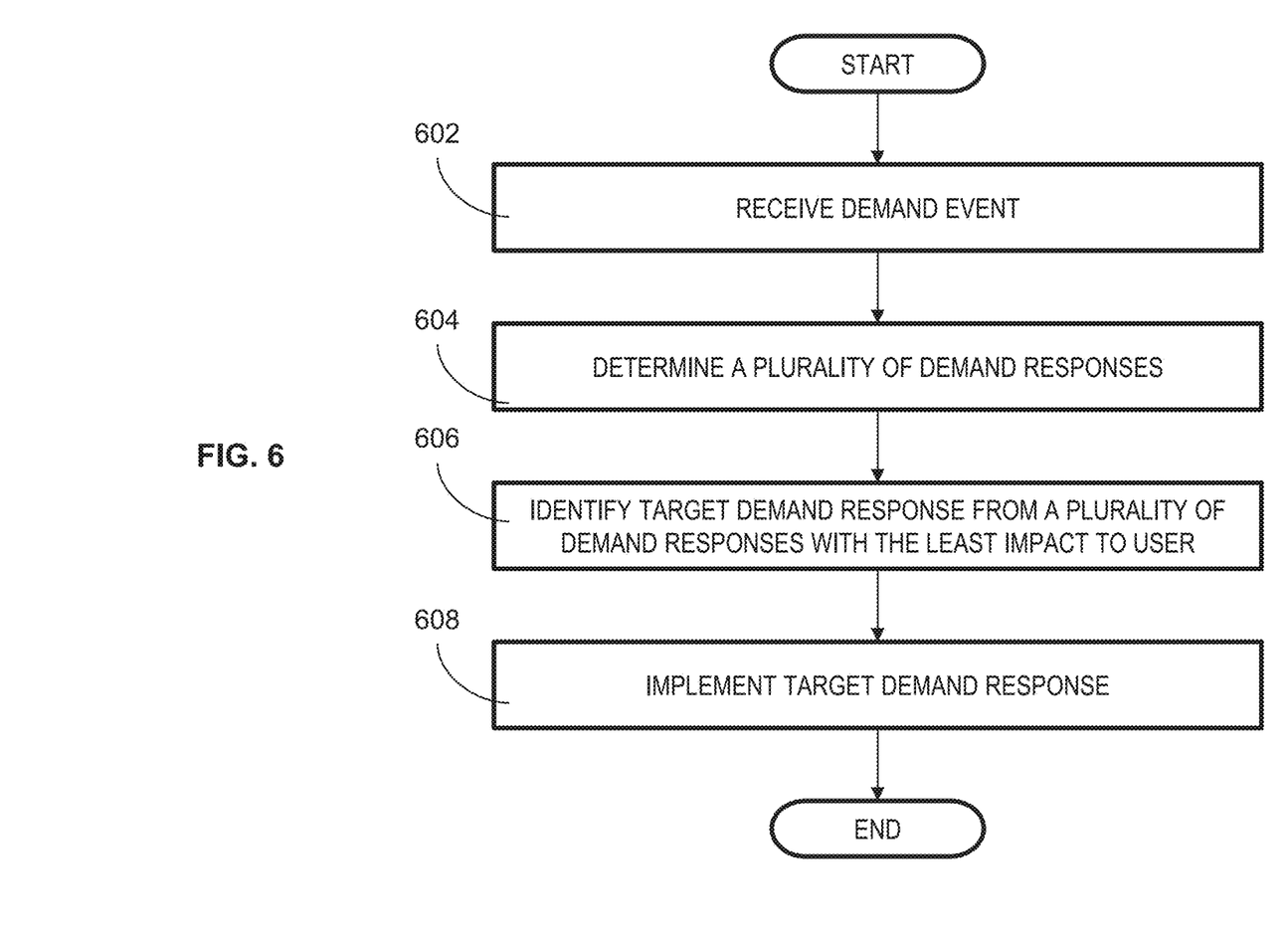
FIG. 6 illustrates a method for providing a demand response according to embodiments.

FIG. 6 illustrates a non-limiting example of a demand response method according to embodiments, and which may be implemented for a single pool or a plurality of pools.

In a block 602, the method may include the pool automation system 104 receiving the demand event from a demand source 106.

In a block 604, the method includes determining a plurality of demand responses for the demand event. As a non-limiting example, the pool automation system 104 may determine different components of components 110 to control and/or deactivate that provide a similar level demand response. As examples, the pool automation system 104 may determine that a first response of deactivating an automatic swimming pool cleaner in combination with a deactivation of a solar heater provides a similar response level as a second response of deactivating the lights in the pool in combination with a deactivation of a waterfall. As another example, the pool automation system 104 may determine that running the pump at a reduced speed in combination with turning off pool lights provides a similar demand response as deactivating the pump.

In a block 606, the method includes determining a target demand response from the plurality of demand responses of block 604 with the least impact to the user. Such a determination may be made based on the components 110 controlled in each response, characteristics of the demand event, etc. Referring to the non-limiting example discussed in block 604, the pool automation system 104 may identify the second response as the target demand response based on the demand event being during the middle of the day and a determination that the user desires the pool cleaner to be active.

In another non-limiting example, block 604 may include determining a plurality of similar demand responses such as turning off critical features of a single pool (e.g., a filtration system) to meet the demand response as a first option and turning off lights at four pools as a second option. In this example, in block 606, the pool automation system may identify the second option as the target demand response because turning off the lights in four pools, in aggregate, may cause less disruption to the users compared to turning off the critical features of the first option.

In block 608, the target demand response may be implemented.

Figure 7:
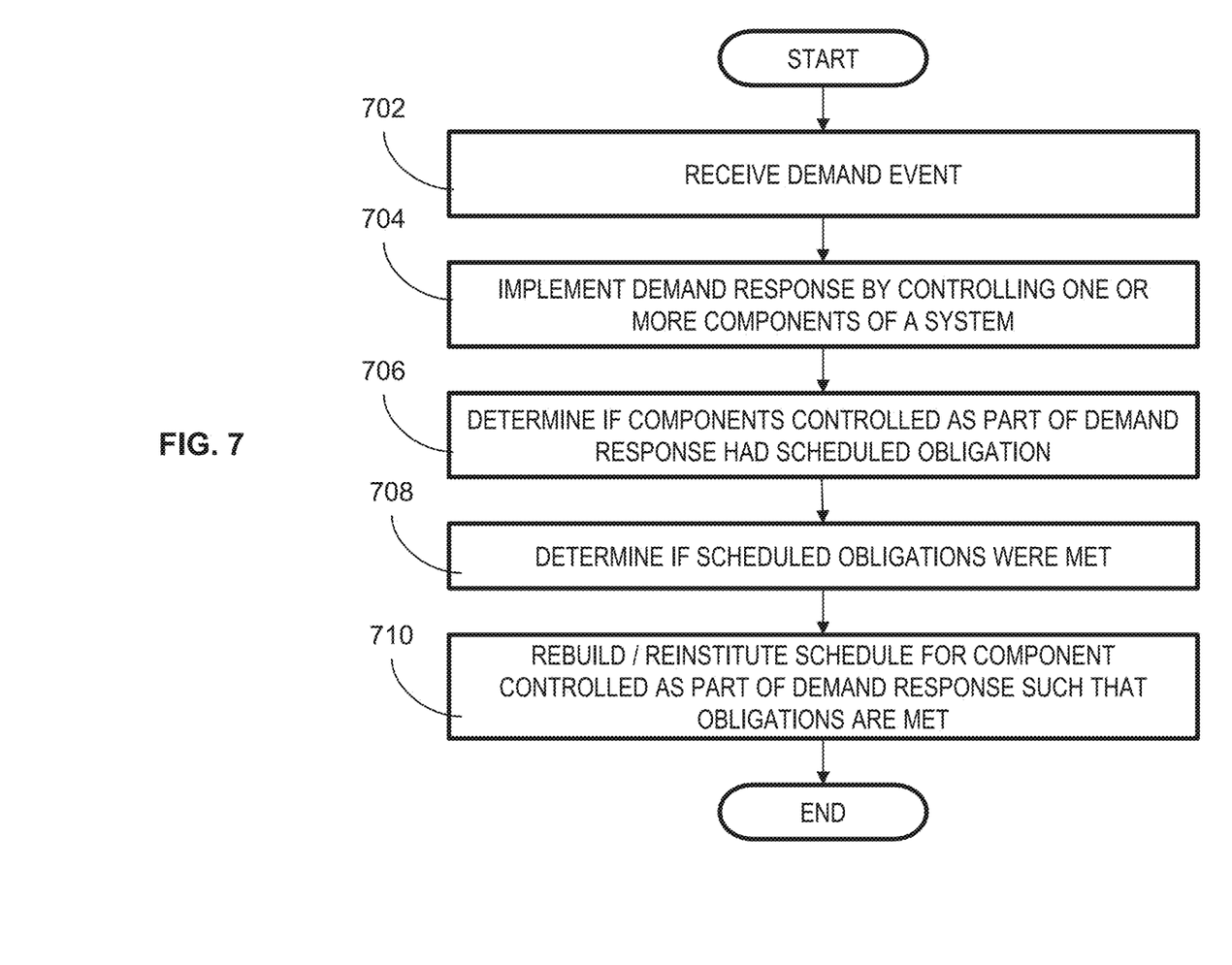
FIG. 7 illustrates a method for providing a demand response according to embodiments.

FIG. 7 illustrates a non-limiting example of a demand response method according to embodiments, and which may be implemented for a single pool or a plurality of pools.

Blocks 702 includes receiving a demand event, and block 704 includes determining whether to comply with the demand event, and if so, controlling one or more components 110 to at least partially comply with the demand event (e.g., similar to the methods outlined in any of FIGS. 3-6).

In block 706, the method may include determining whether any components 110 that were controlled as part of the demand response had a scheduled obligation, and in block 708, the method includes determining if the scheduled obligations were met. As a non-limiting example, the pool automation system 104 may determine that the pump was controlled as part of the demand response in block 704, but the pump was scheduled to run to keep clarity and sanitization levels within certain thresholds. In this example, in block 708, the method includes determining whether the clarity and sanitization levels were met and/or within the thresholds.

In a block 708, if the obligations were not met in block 708, the pool automation system 104 builds and/or reinstitutes a schedule for items that were exposed to the demand event and controlled (e.g., had their function reduced, turned off, etc.), but require more time to function to meet their daily obligations to the pool system 102. As a non-limiting example, the system 104 may determine that the pump needs to be run an hour or two longer to keep clarity and sanitization levels within certain thresholds, and as a result, adjusts the schedule/control the pump accordingly. Various other rebuilding and/or reinstituting, of schedules may be determined and implemented as desired.

The aforementioned methods and examples are for illustrative purposes only and should not be considered limiting, and in other embodiments, pool automation systems 104 may implement demand responses in various ways as desired based on classification and prioritization of components 110 of the pool system 102. Moreover, as mentioned above, the disclosed systems and methods are not limited to pools and spas but could also be used with home automation systems and/or automotive applications to selectively decrease power loads. For example, select smart LEDs in a home could be turned off instead of turning off all power to a home using a home automation device.

Exemplary concepts or combinations of features of the invention may include:

A. A method of controlling a demand response, the method including receiving a demand event comprising a required load, determining a demand response for an electrical system comprising at least one adjustable component, and controlling the at least one adjustable component such that the demand response meets the required load.

B. The method according to statement A, wherein the electrical system comprises a pool system, and wherein the at least one adjustable component comprises at least one piece of pool equipment or feature associated with the pool system.

C. The method according to statement A or B, wherein determining the demand response comprises determining a plurality of demand responses.

D. A demand response system comprising a controller configured to receive a demand event, receive system information from an electrical system, and determine a demand response for the electrical system based on the received demand event and based on the system information from the electrical system.

E. The demand response system according to statement D, wherein the controller is further configured to send a control signal to the electrical system comprising the demand response, the control signal configured to control at least one aspect of the electrical system.

F. The demand response system according to statement D or E, wherein the electrical system is a pool system.

G. The demand response system according to any one of statements D-F, wherein the controller is a pool automation system.

H. A pool automation system comprising a controller connectable to at least one piece of equipment associated with a pool, wherein the controller is configured to receive a demand event comprising at least one demand characteristic, determine a demand response based on the at least one demand characteristic and a characteristic of the at least one piece of equipment, and control the at least one piece of equipment pursuant to the demand response.

I. The pool automation system according to statement H, wherein the characteristic of the at least one piece of equipment comprises a power usage, monetary cost, a safety criticality, a user preference, or a preprogrammed rule.

J. A pool automation system comprising a controller connectable to at least one piece of equipment associated with a pool, wherein the controller is configured to receive a demand event comprising at least one demand characteristic and determine a demand response based on the at least one demand characteristic of the demand event.

K. The pool automation system according to statement J, wherein the controller is further configured to control the at least one piece of equipment pursuant to the determined demand response.

L. A pool automation system comprising a controller connectable to at least one piece of equipment associated with a pool, wherein the controller is configured to receive a demand event comprising at least one demand characteristic and determine a demand response based on a response preference and/or time of day of the demand event and such that the demand response meets the at least one demand characteristic.

M. The pool automation system according to statement L, wherein the at least one demand characteristic comprises a required load reduction.

N. The pool automation system according to statement L or M, wherein the controller is further configured to control the at least one piece of equipment pursuant to the determined demand response.

O. A demand control system configured to receive a demand event comprising at least one demand characteristic, receive information from a plurality of pool automation systems, and determine an aggregate demand response for the plurality of pool automation systems such that the demand response meets the at least one demand characteristic.

P. A pool automation system comprising a controller connectable to at least one piece of equipment associated with a pool, wherein the controller is configured to receive a demand event comprising at least one demand characteristic and determine a demand response that meets the at least one demand characteristic based on at least one of a utilization of the at least one piece of equipment, a schedule for the at least one piece of equipment, or pool industry knowledge.

Q. A pool automation system comprising a controller connectable to at least one piece of equipment associated with a pool, wherein the controller is configured to receive a demand event and determine a demand response based on information gathered by the pool automation system about the at least one piece of equipment.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention. Further, although applicant has described devices and techniques for use principally with pools, persons skilled in the relevant field will recognize that the present invention conceivably could be employed in connection with other objects and in other manners. Finally, references to "pools" and "swimming pools" herein may also refer to spas or other water containing vessels used for recreation, training, or therapy and for which cleaning of debris is needed or desired.

The invention claimed is:

1. A pool automation system comprising a controller connectable to a plurality of pieces of equipment associated with a pool, wherein the controller is configured to:
   gather information about each of the plurality of pieces equipment associated with the pool and classify each of the plurality of pieces of equipment associated with the pool into one of a plurality of classifications of equipment associated with the pool based on the gathered information;
   receive a demand event with a requested load reduction;
   determine a demand response for the demand event based on the classification of the plurality of pieces of equipment associated with the pool; and
   control the plurality of pieces of equipment pursuant to the demand response.

2. The pool automation system of claim 1, wherein the plurality of pieces of equipment associated with the pool are selected from the group consisting of pool lights, pool pumps, booster pumps, electric cleaners, heaters, water features, fire features, entertainment features, heat pumps, solar heaters, sanitizers, filtration systems, primary sanitizers, and spas.

3. The pool automation system of claim 1, wherein the controller is configured to classify each of the plurality of pieces of equipment associated with the pool based on power usage, user selected preferences, criticality to user health, criticality to safe pool operation, a preprogrammed rule, or monetary cost.

4. The pool automation system of claim 1, wherein the demand event comprises at least one demand characteristic, and wherein the controller is configured to determine the demand response based on the at least one demand characteristic.

5. The pool automation system of claim 4, wherein the at least one demand characteristic comprises a current load level, a target load level, or a demand event duration.

6. The pool automation system of claim 1, wherein the controller is configured to determine a plurality of demand responses for the demand event, identify a target demand response from the plurality of demand responses, and control the equipment pursuant to the target demand response.

7. The pool automation system of claim 1, wherein the controller is configured to determine non-compliance with the requested load reduction as the demand response based on the classification of the plurality of pieces of equipment associated with the pool.

8. The pool automation system of claim 1, wherein the controller is configured to determine partial compliance with the requested load reduction as the demand response based on the classification of the plurality of pieces of equipment associated with the pool.

9. The pool automation system of claim 1, wherein the controller is configured to determine full compliance with the requested load reduction as the demand response based on the classification of the plurality of pieces of equipment associated with the pool.

10. A method of controlling equipment associated with a swimming pool or spa, the method comprising:
gathering information about the equipment associated with the pool and classifying the equipment associated with the pool into one of a plurality of classifications of equipment associated with the pool based on the gathered information;
receiving a demand event with a requested load reduction;
determining a demand response for the demand event based on the classification of the equipment associated with the pool; and
controlling the equipment pursuant to the demand response.

11. The method of claim 10, wherein determining the demand response comprises determining noncompliance, partial compliance, or full compliance with the requested load reduction.

12. The method of claim 10, wherein classifying the equipment associated with the pool is based on power usage, user selected preferences, criticality to user health, criticality to safe pool operation, a preprogrammed rule, or monetary cost.

13. The method of claim 10, wherein classifying the equipment associated with the pool comprises grouping the equipment associated with the pool based on a first criteria, and within each group, prioritizing the equipment associated with the pool based on a second criteria different from the first criteria.

14. The method of claim 10, wherein the equipment associated with the pool comprises one or more of pool lights, pool pumps, booster pumps, electric cleaners, heaters, water features, fire features, entertainment features, heat pumps, solar heaters, sanitizers, filtration systems, primary sanitizers, and spas.

15. The method of claim 10, wherein the demand event comprises at least one demand characteristic, and wherein the method comprises determining the demand response based on the at least one demand characteristic.

16. The method of claim 15, wherein the at least one demand characteristic comprises a current load level, a target load level, or a demand event duration.

17. A pool automation system comprising a controller connectable to a plurality of pieces of equipment associated with a pool, wherein the controller is configured to:
gather information about each of the plurality of pieces equipment associated with the pool and classify each of the plurality of pieces of equipment associated with the pool based on the gathered information and based on a criticality to health and safe operation of the pool;
receive a demand event with a requested load reduction and comprising at least one demand characteristic;
determine a demand response based on the at least one demand characteristic and the classification of at least one piece of equipment of the plurality of pieces of equipment associated with the pool; and
control the at least one piece of equipment pursuant to the demand response.

18. The pool automation system of claim 17, wherein the pool is a first pool of a plurality of pools, wherein the controller is connectable to a plurality of pieces of equipment, each associated with at least one pool of the plurality of pools, and wherein the controller is configured to determine an aggregate demand response for the plurality of pools such that the demand response meets the at least one demand characteristic.

19. The pool automation system of claim 17, wherein the controller is configured to determine noncompliance, partial compliance, or full compliance with the demand event as the demand response.

20. The pool automation system of claim 17, wherein the at least one piece of equipment associated with a pool comprises one or more of pool lights, pool pumps, booster pumps, electric cleaners, heaters, water features, fire features, entertainment features, heat pumps, solar heaters, sanitizers, filtration systems, primary sanitizers, and spas.

* * * * *